Patented Aug. 27, 1940

2,212,532

UNITED STATES PATENT OFFICE 2,212,532

ETHERS OF TRIMETHYLHYDROQUINONE AND PROCESS OF PREPARING THEM

Fritz von Werder, Darmstadt, Germany, assignor to Merck & Co., Inc., Rahway, N. J., a corporation of New Jersey No Drawing. Application October 11, 1938, Serial No. 234,508. In Germany October 14, 1937

10 Claims. (Cl. 260—613)

This invention relates to ethers of trimethylhydroquinone and to processes of preparing the same, and more particularly to mono-ethers of trimethylhydroquinone having the formula $$C_6H(CH_3)_3(OH)OR,$$

wherein R is a member selected from the group consisting of an alkyl radical, an alkylene radical, and a hydroaromatic radical, said radicals having from 6 to 14 carbon atoms.

The mono-ethers of the above type may be prepared in various ways, for example by reacting trimethylhydroquinone with an alkyl halide, an alkylene halide, or a hydroaromatic radical halide, said radicals having from 6 to 14 carbon atoms preferably in an alkaline solution such as an alcoholic alkaline or an acetonic alkaline solution. Also, the direct condensation of the alcohol with trimethylhydroquinone may be effected in the presence of acids. The desired mono-ethers may also be obtained by etherifying a mono-acyl trimethylhydroquinone, for example the mono-acetyl compound, and subsequently removing the acyl group by saponification.

Theoretically, there are formed two different mono-ethers of the trimethylhydroquinone for each alcohol, but in different quantities, because trimethylhydroquinone is an unsymmetrical compound. It is not possible to determine which of the two possible ethers result as the basic product, because no mono-ethers and mono-esters of trimethylhydroquinone with fully explained structure are known, which can be used for comparative purposes.

In the preparation of the mono-ethers according to the present invention, di-ethers often result as by-products. The two ethers can be easily separated from each other because of their different solubility in organic solvents. After separation of the ethers, the di-ether may be treated with an agent capable of cleaving it into a mono-ether, for example aluminum chloride, acid salts, such as potassium bi-sulfate, acid halides, aniline hydrochloride, etc. In each individual case of cleavage to the mono-ether, the best possible reaction conditions should be determined by a series of comparative tests, such as the determination of the quantity or concentration of the cleavage agent, temperature, etc. In general, the cleavage can be effected by refluxing a solution of the di-ether in a solvent such as benzene, in the presence of anhydrous aluminum chloride, and recovering the mono-ether by distillation.

The following example illustrates a method of carrying out the present invention, but it is understood that the example is by way of illustration and not of limitation.

Example 7.6 g. of trimethylhydroquinone (M. P. 169° C.) and 15 g. of dodecyl bromide are dissolved in 50 cc. of absolute alcohol and heated to the boiling point. A current of an indifferent gas is conducted through the solution while stirring, and about 50 cc. of N/2 alcoholic potassium hydroxide are added drop by drop, requiring about two hours. The temperature of the reaction mixture is then held at 90° C. for another five hours. Upon cooling, the whole solidifies to a crystalline mash, which is filtered while excluding the atmospheric oxygen. This residue, and the residue obtained upon further concentration of the liquid, is washed with water to remove potassium bromide, and is then dissolved in warm acetic ester. Upon cooling, the more difficultly soluble by-product trimethylhydroquinone-dodecyl-bis-ether ($C_{33}H_{60}O_2$, M. P. 47° C.) first separates out, and is removed. Then the trimethylhydroquinone-dodecyl-mono-ether, $C_{21}H_{36}O_2$, crystallizes out. After several repeated fractional crystallizations from acetic ester, the compound melts at 81° C., and can be converted in the known manner into a well crystallized allophanate, $C_{23}H_{38}O_4N_2$, M. P. 184° C.

Other similar ethers may be obtained by substituting for the dodecyl bromide, different alkyl halides, alkylene halides, and hydroaromatic halides, in which the radicals have from 6 to 14 carbon atoms.

The mono-ethers of the present invention have striking physical and chemical properties. In spite of their phenolic nature, they are insoluble in alkali, and in general possess very weak phenolic properties. Generally speaking, they are crystalline and can be distilled in high vacuum. Chemically, they are characterized by strong reducing action. For example, in alcohol solution with gentle warming, silver nitrate is reduced to metallic silver. They possess valuable therapeutic properties. And physiologically, they control sex functions. For example the so-called "resorption sterility" of female rats is overcome by the addition of the ether to the diet of the animals.

I claim:
1. Compounds of the formula

$$C_6H(CH_3)_3(OH)OR,$$

wherein R is a member selected from the group consisting of an alkyl radical, an alkylene radical, and a hydroaromatic radical, said radicals having from 6 to 14 carbon atoms.

2. The compound $C_6H(CH_3)_3(OH)OR$, in which R is an alkyl radical having from 6 to 14 carbon atoms.

3. The compound $C_6H(CH_3)_3(OH)OR$, in which R is an alkylene radical having from 6 to 14 carbon atoms.

4. The compound $C_6H(CH_3)_3(OH)OR$, in which R is a hydroaromatic radical having from 6 to 14 carbon atoms.

5. The compound of the formula $$C_6H(CH_3)_3(OH)OC_{12}H_{25}.$$

6. The process comprising reacting trimethyl-hydroquinone with a member selected from the group consisting of an alkyl halide, an alkylene halide and a hydroaromatic radical halide, said radicals having from 6 to 14 carbon atoms.

7. The process according to claim 6, in which the reaction is carried out in a solution of an alkali metal hydroxide.

8. The process comprising reacting trimethyl-hydroquinone with dodecyl-bromide in the presence of a solution of an alkali metal hydroxide.

9. The process comprising reacting trimethyl-hydroquinone with dodecyl-bromide in the presence of a solution of an alkali metal hydroxide, separating the di-ether from the mono-ether formed by the reaction, reacting the di-ether with an agent capable of cleaving the di-ether into a mono-ether, and recovering the mono-ether.

10. The process comprising reacting trimethyl-hydroquinone with dodecyl-bromide, separating the di-ether from the mono-ether formed by the reaction, treating the di-ether with anhydrous aluminum chloride, and recovering the mono-ether formed by the latter reaction.

FRITZ VON WERDER.